US012752863B2

(12) United States Patent
Kajdos et al.

(10) Patent No.: US 12,752,863 B2
(45) Date of Patent: Oct. 6, 2026

(54) LOGISTICS BEAM FOR CARGO TRAILER

(71) Applicant: Kinedyne LLC, Prattville, AL (US)

(72) Inventors: Mark Kajdos, Prattville, AL (US); Jason Lueck, Prattville, AL (US)

(73) Assignee: Kinedyne LLC, Prattville, AL (US)

( * ) Notice: Subject to any disclaimer, the term of this patent is extended or adjusted under 35 U.S.C. 154(b) by 336 days.

(21) Appl. No.: 18/639,616

(22) Filed: Apr. 18, 2024

(65) Prior Publication Data

US 2024/0351530 A1 Oct. 24, 2024

Related U.S. Application Data

(60) Provisional application No. 63/497,112, filed on Apr. 19, 2023.

(51) Int. Cl.
*B60R 11/00* (2006.01)
*B60P 7/08* (2006.01)
*B60P 7/15* (2006.01)
*B62D 33/04* (2006.01)

(52) U.S. Cl.
CPC ................ *B62D 33/04* (2013.01); *B60P 7/08* (2013.01); *B60P 7/15* (2013.01); *B60R 11/00* (2013.01); *B60R 2011/0036* (2013.01)

(58) Field of Classification Search
CPC ...... B60P 7/15; B60P 7/14; B60P 7/13; B60P 7/08; B62D 33/04; B62D 33/0207
USPC .......................................................... 410/150
See application file for complete search history.

(56) References Cited

U.S. PATENT DOCUMENTS

| | | | | | |
|---|---|---|---|---|---|
| 4,702,653 | A * | 10/1987 | Gaulding | B60P 7/15 410/152 |
| 8,172,494 | B1 * | 5/2012 | Knox | B60P 1/00 410/148 |
| 11,772,541 | B2 * | 10/2023 | Moore | B60P 7/0815 410/2 |
| 2019/0234442 | A1 * | 8/2019 | Shangle | F16B 7/0446 |
| 2020/0269936 | A1 * | 8/2020 | da Rosa | B62D 33/04 |
| 2023/0406221 | A1 * | 12/2023 | Kauffman | B60R 11/00 |

* cited by examiner

*Primary Examiner* — Caroline N Butcher
(74) *Attorney, Agent, or Firm* — Shook, Hardy & Bacon L.L.P.

(57) ABSTRACT

A logistics beam for a cargo trailer can include latches that are in the ends of the beam and that engage slots in the side of the cargo trailer. In examples, the latches are simultaneously retractable using the same actuator mechanism. In other words, by operating a single actuator mechanism, both latches at the two terminal ends of the logistics beam can be retracted to disengage from the slots and permit a height of the logistics beam to be adjusted (e.g., moved to a different set of slots).

20 Claims, 8 Drawing Sheets

LOGISTICS BEAM FOR CARGO TRAILER

CROSS REFERENCE TO RELATED APPLICATIONS

This application claims the priority benefit of U.S. Application Ser. No. 63/497,112 (filed Apr. 19, 2024), which is incorporated herein by reference in its entirety.

BACKGROUND

Some cargo trailers can include a series of cross beams (e.g., logistics beams) that extend, inside the trailer, from one side to the other side. Often these beams can selectively attach to slots positioned at various heights of the trailer and for various purposes. For example, in some instances, the cross beams can be used to support a decking or platform surface for stacking or organizing cargo. In some examples, the beams can be positioned to impede cargo from shifting forward or rearward.

For decking applications, logistic beams can be built with the strength to support an extra layer of cargo on the inside of the trailer. This additional "floor" can be used to increase the trailer's capacity, which in turn can increase the amount of loads that can be secured, while reducing the number of trips needed to transport the cargo. This can also reduce the risk of damaged freight, since it is less likely that uneven items are stacked on top of each other, and instead the items can be stacked on the deck.

For shoring applications (e.g., impeding side-to-side or front-to-back shifting), logistics beams can create a solid and supportive hold on the cargo, maintaining items in place while providing a barrier between loads. In addition to reducing the likelihood that cargo might shift into one another, separating loads can help maintain organization within the trailer. For example, the logistics beams can help reduce the likelihood of cargo from different deliveries being intermixed and can reduce time associated with sorting, thereby improving efficiencies.

DETAILED DESCRIPTION OF DRAWINGS

The present systems and methods for a logistics beam for a cargo trailer are described in detail below with reference to these figures.

Figure 4:
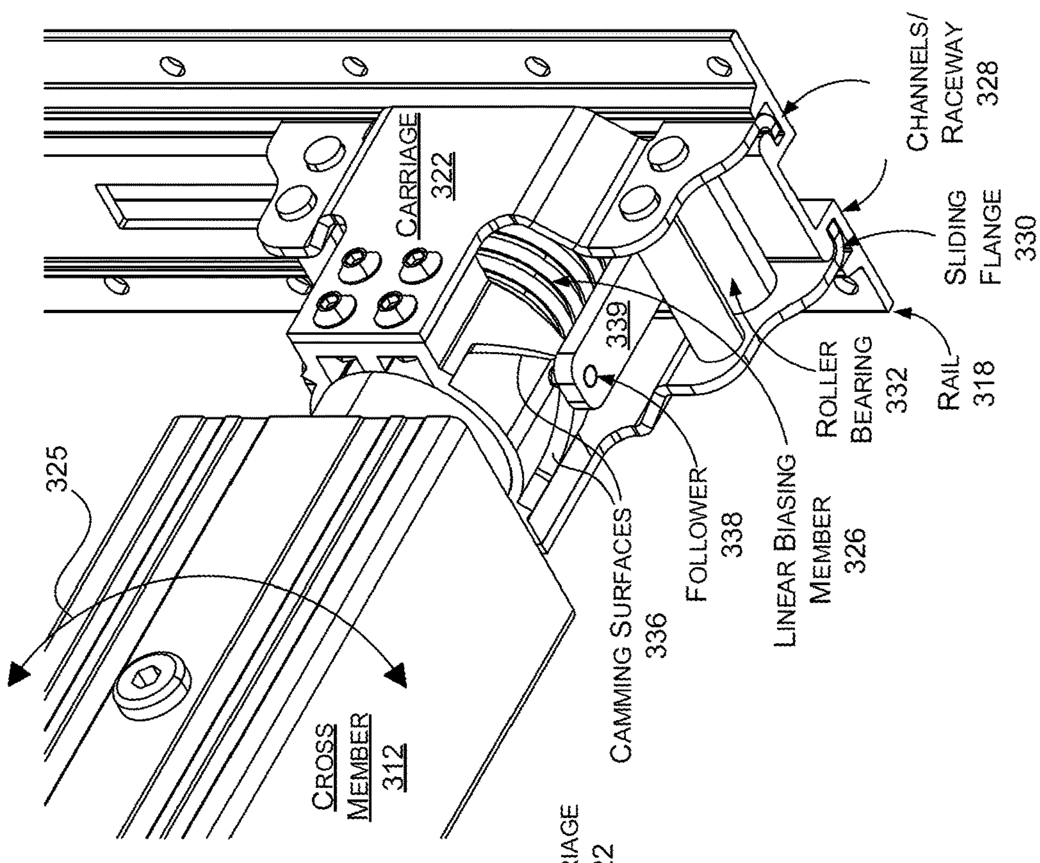
Figure 5:
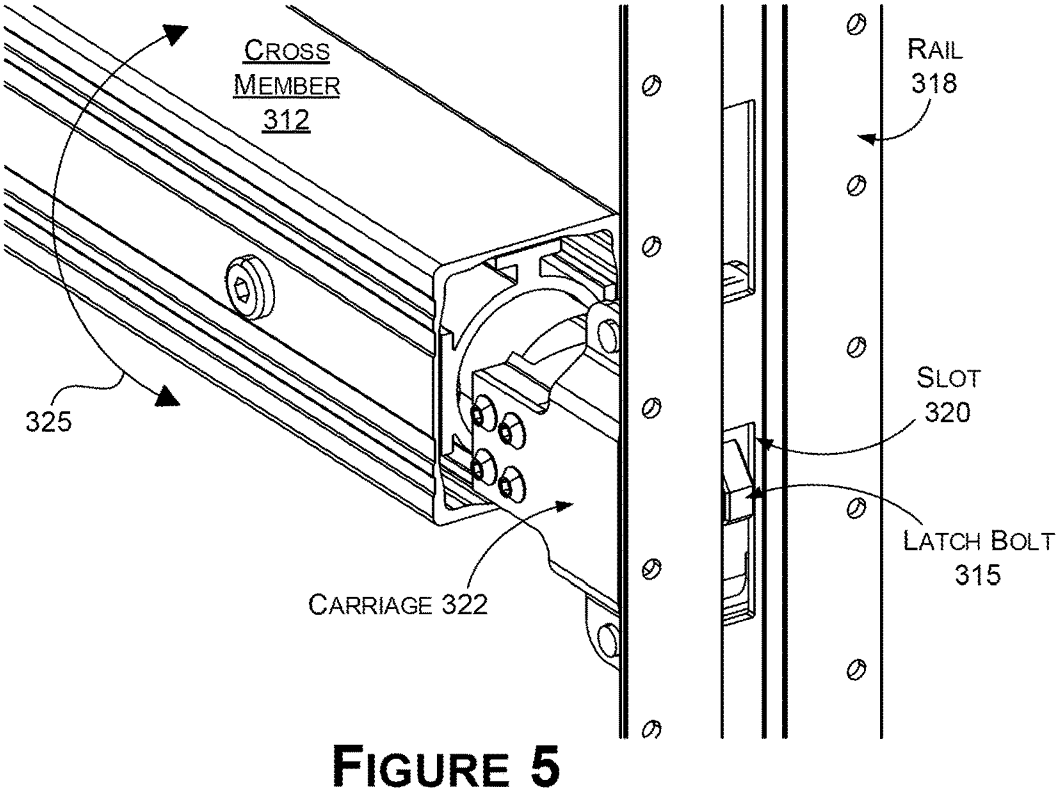
Figure 6:
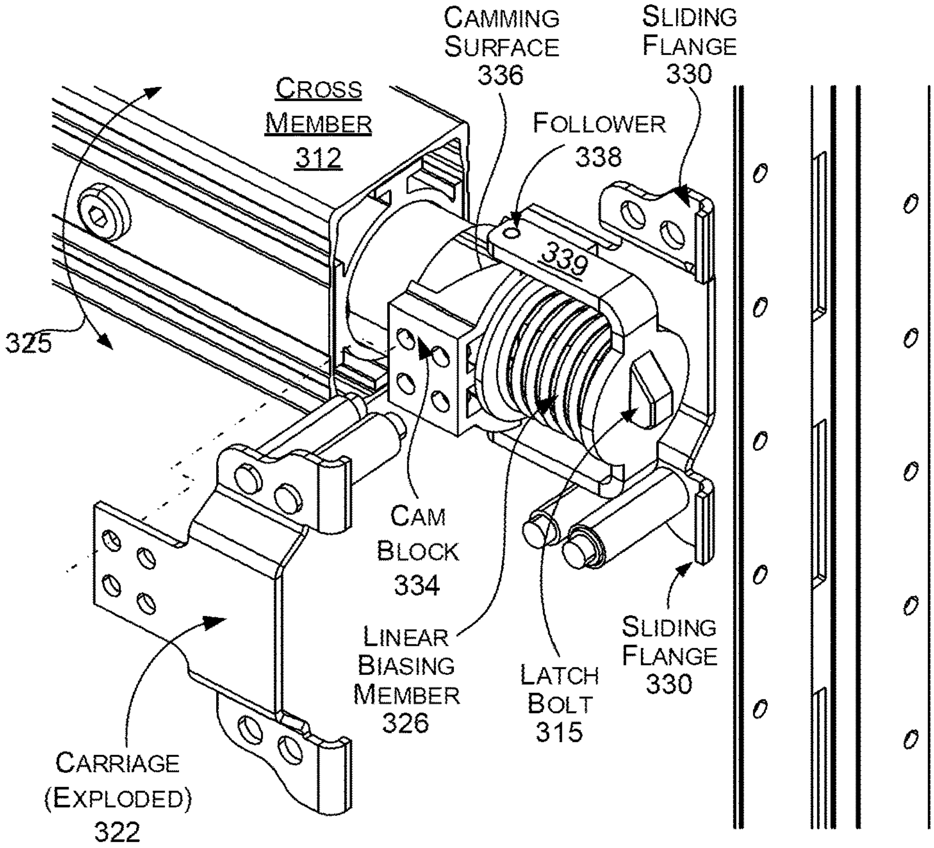

FIGS. 4, 5, and 6 depict other views of the retractable latch assembly, in accordance with examples of this disclosure.

Figure 7:
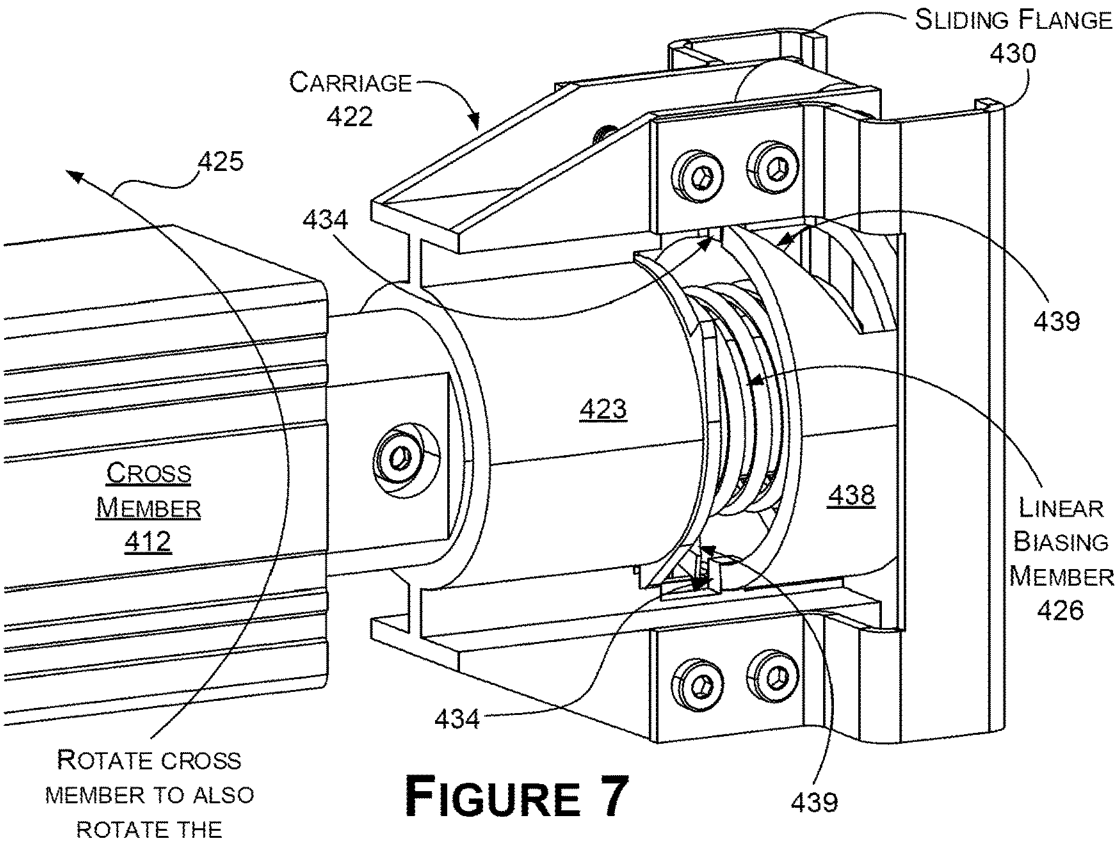
Figure 8:
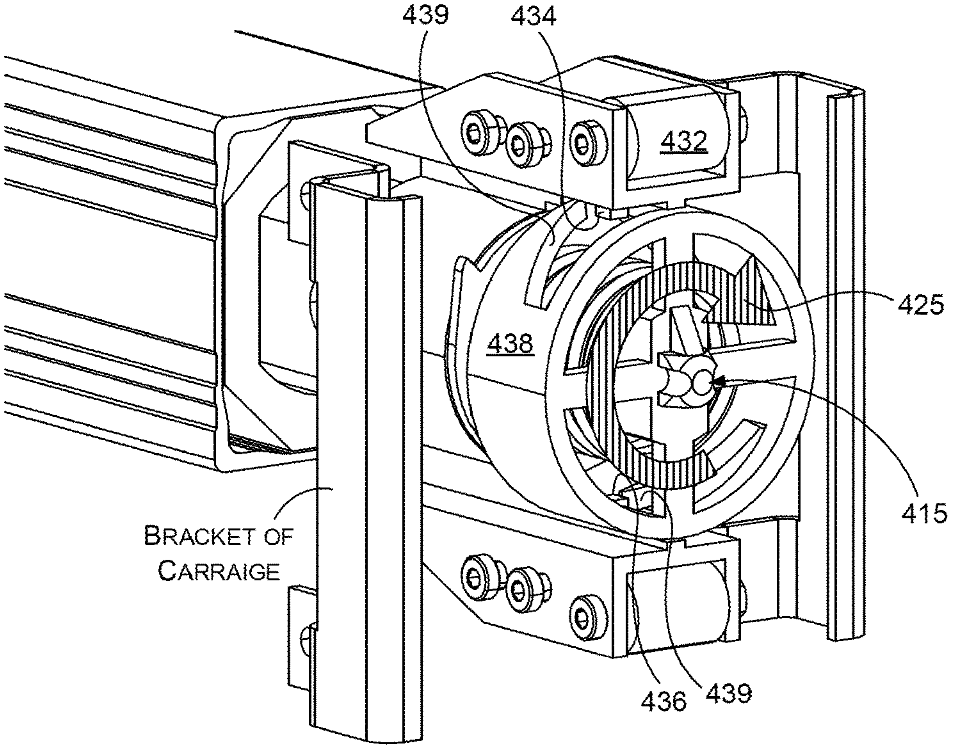
Figure 9:
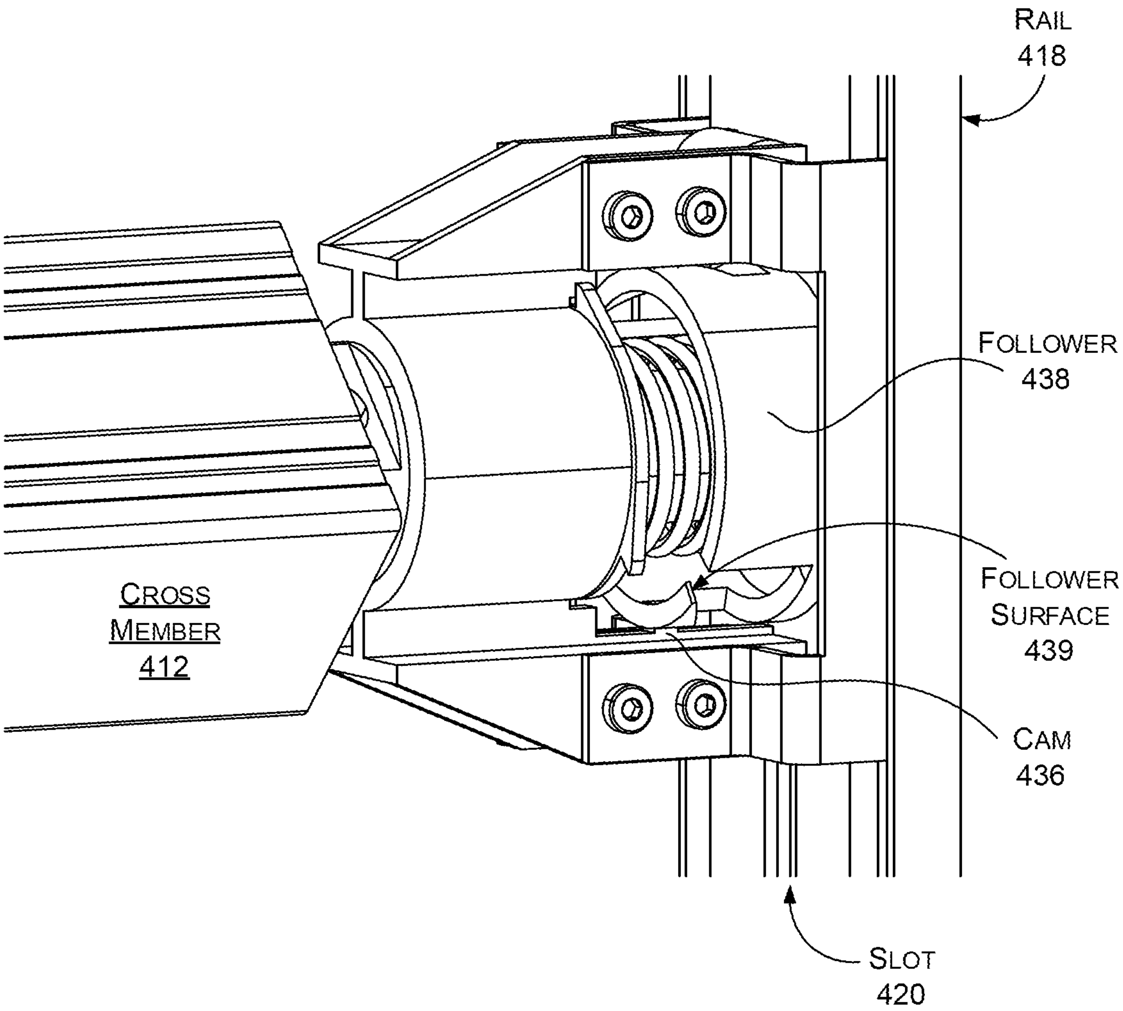

FIGS. 7, 8, and 9 depict views of another retractable latch assembly, in accordance with examples of this disclosure.

Figure 10A:
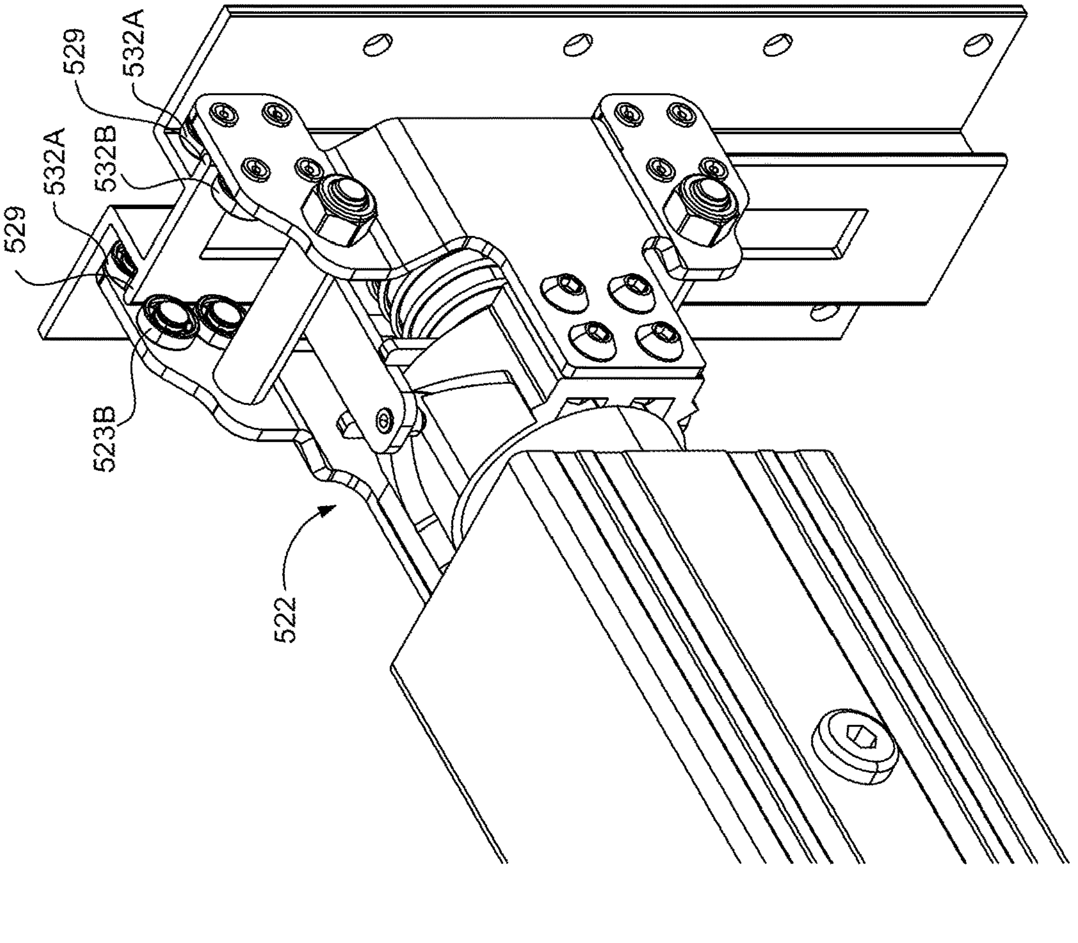
Figure 10B:
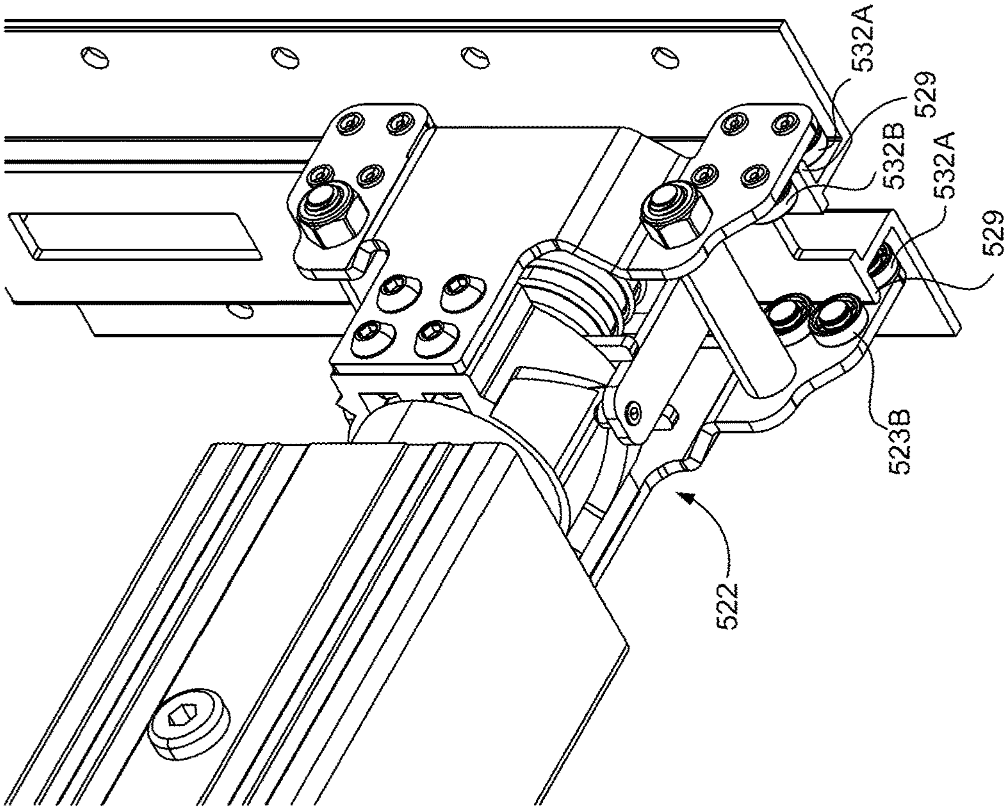

FIGS. 10A and 10B depicts views of another retractable latch assembly, in accordance with examples of this disclosure.

DETAILED DESCRIPTION

This detailed description is related to a logistics beam for a cargo trailer in which latches that are in the ends of the beam and that engage slots in the side of the cargo trailer are simultaneously retractable using the same actuator mechanism. In other words, by operating a single actuator mechanism, both latches at the two terminal ends of the logistics beam can be retracted to disengage from the slots and permit a height of the logistics beam to be adjusted (e.g., moved up or down to a different set of slots).

In some examples, the actuator mechanism is operated by rotating the logistics beam relative to a longitudinal orientation or axis of the logistics beam. That is, the beam can extend, in a longitudinal orientation, from one side of the cargo trailer to the opposing side of the cargo trailer. In examples, a portion of the beam can be rotated relative to the longitudinal orientation (e.g., relative to an axis of rotation that is substantially parallel with the longitudinal orientation), and the rotation of the portion can, in turn, cause a latch at each end of the beam to retract and disengage from a respective slot.

In some examples, the logistics beam can include, at each end, a component that remains substantially fixed relative to the rotation motion of the portion that rotates. For example, the beam can include a carriage that is slidably coupled to a slotted rail and that can slide along a channel or raceway associated with the rail. That is, the carriage can both connect the beam to the slotted rail and operate to slide, glide, roll, or otherwise transit along the rail when the height of the logistics beam is being adjusted.

In some examples, the portion of the beam that remains substantially fixed can include a first portion of a cam mechanism, and the latch can be associated with a second portion of the cam mechanism. As such, when the portion of the logistics beam that rotates is rotated, the first portion and second portions of the cam mechanism can operate to retract the latch.

Various examples are described below with reference to the figures, and the relationship and functioning of the various elements of the examples can be better understood by reference to the following detailed description. However, the subject matter of this application is not limited to those illustrated in the drawings or explicitly described below. The drawings are not necessarily to scale, and in certain instances details may have been omitted that are not necessary for an understanding of subject matter disclosed herein, such as conventional fabrication and assembly.

Figure 1:
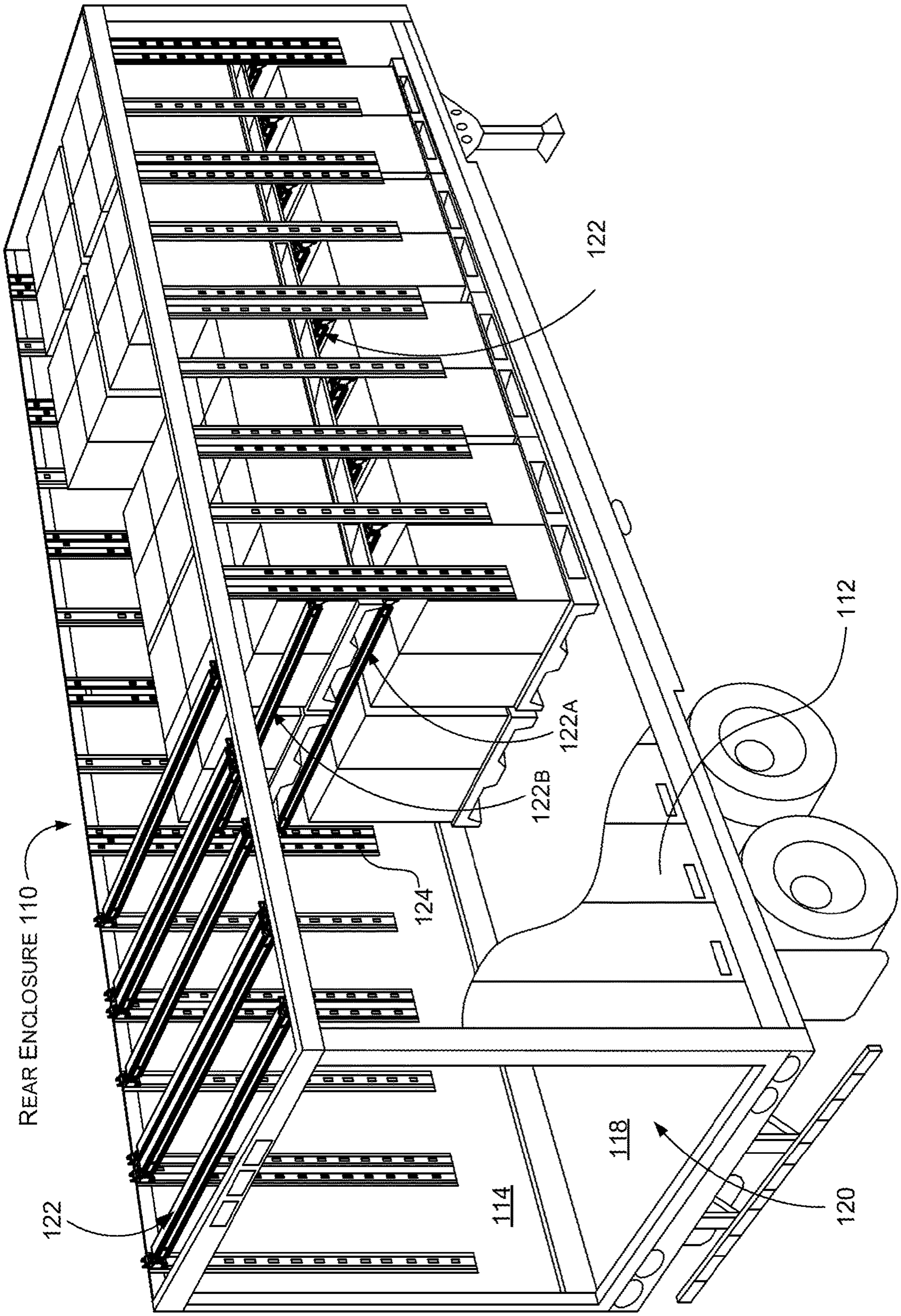
FIG. 1 depicts a trailer with logistics beams, in accordance with examples of this disclosure.

Referring to FIG. 1, subject matter of the present disclosure is related to a rear enclosure for a trailer or for an on-frame cargo system (e.g., a box truck or other vehicle in which the rear enclosure is secured to the vehicle frame). FIG. 1 depicts a rear enclosure 110 that could be for a trailer, and subject matter of this disclosure could also apply to a rear enclosure secured directly to a vehicle frame. The rear enclosure 110 generally includes a first side wall 112, a second side wall 114, a roof (omitted for illustration), and a floor 118. In at least some examples, the rear enclosure 110 can include an opening 120 that provides access to an enclosed space for containing and securing cargo.

Although a vehicular application is illustrated, the logistics beam of the present disclosure can be used in any application in which a beam extends between two sets of slots (e.g., on opposing walls) and is movable from one set of slots to another set of slots.

In examples associated with the present disclosure, the rear enclosure 110 can include a series of cross beams 122 (e.g., logistics beams) that extend, inside the rear enclosure 110, from one side 112 to the other side 114. These beams 122 can selectively attach to slots 124 positioned at various heights of the rear enclosure 110 for various purposes. For example, in some instances, the cross beams 122*a* can be used to support a decking or platform surface for stacking or organizing cargo. In some examples, the beams 122*b* can be positioned to shore cargo or freight (e.g., impede cargo from shifting forward or rearward).

In examples, the beams 122 can be made from extruded high-strength aluminum, configured to provide sufficient strength and also be light weight. Often, beams can be available in adjustable sizes (e.g., 84.6" to 95" for 96-inch sized trailers; 91.9" to 102.3" for 96-inch and 102-inch sized trailers; and 96.2" to 106.6" for 102-inch sized high cube trailers).

Figure 2:
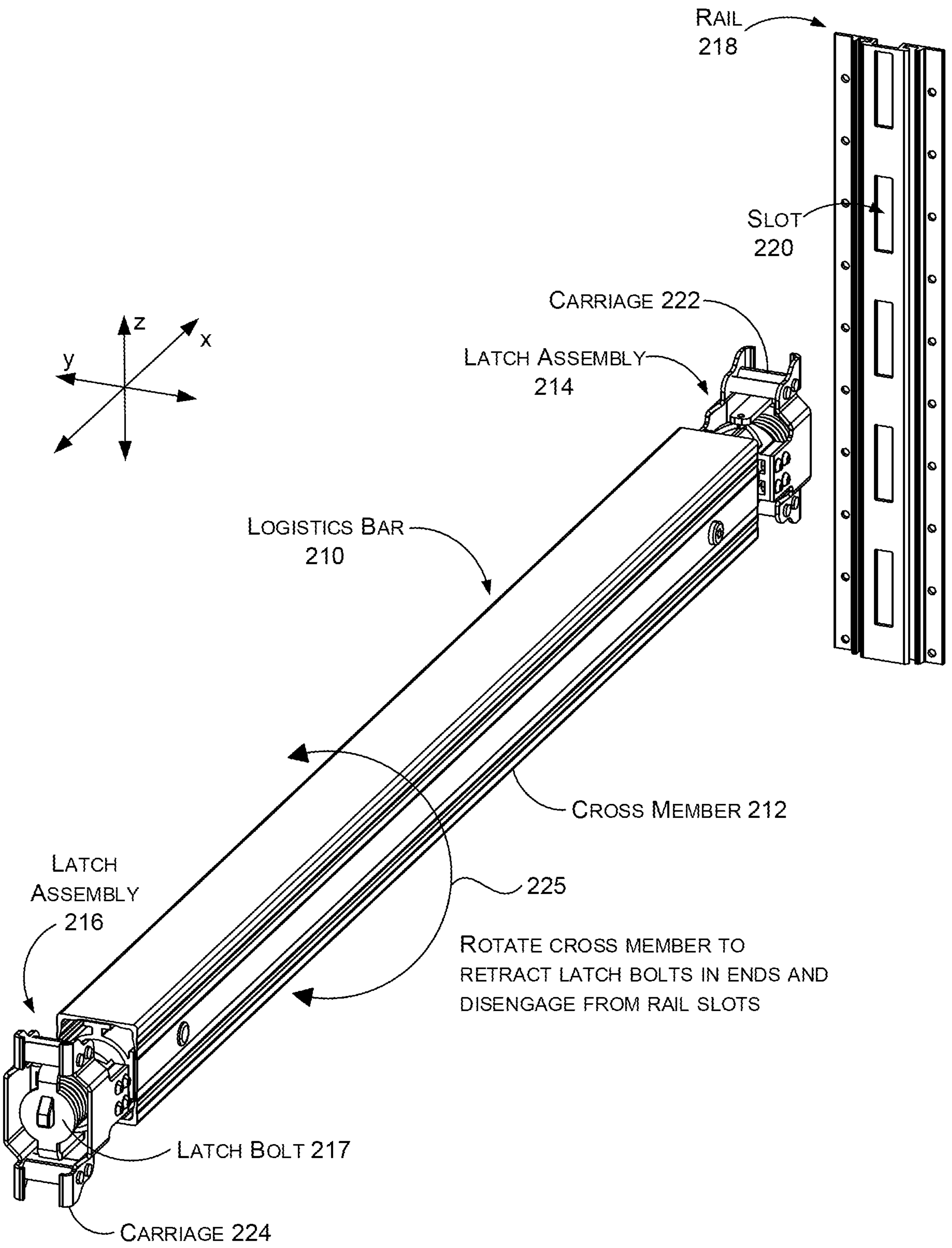
FIG. 2 depicts a logistics beam, in accordance with examples of this disclosure.

Referring now to FIG. 2, an example of a beam 210 is illustrated that could operate as one of the beams 122 in FIG. 1. In examples, the beam 210 includes a cross member 212 and a latch assembly 214 and 216 at each end. In addition, each latch assembly 214 and 216 can selectively engage a rail 218 with slots 220 (e.g., for ease of illustration one rail 218 is depicted and it is understood that the latch assembly 216 can engage a second rail that is not shown). In examples, the beam 210 can be moved up and down, relative to the rail 218, and a desired height for the beam 210 can be set by engaging the latch assemblies to a slot at that desired height.

In at least some examples, the beam 210 can include, at each end, a carriage 222 and 224 that is slidably coupled to rail 218 and that can traverse or transit (e.g., slide, glide, roll, etc.) along a channel or raceway associated with the rail 218. That is, the carriage can both connect the beam 210 to the rail 218 and operate to facilitate transiting along the rail 218 when the height of the logistics beam 210 is being adjusted.

In at least some examples, the latch assemblies 214 and 216 (e.g., the latch bolt or pawl 217 of the latch assembly 216 as well as a similar structure obscured from view on the latch assembly 218) can be simultaneously retractable using the same actuator mechanism. In other words, by operating a single actuator mechanism, both latches at the two terminal ends of the logistics beam can be retracted to disengage from the slots and permit a height of the logistics beam to be adjusted (e.g., moved to a different set of slots).

In some examples, the latch assemblies 214 and 216 can include a spring-loaded latch bolt or pawl that can engage the slot at a desired height. In addition, in some instances, the spring-loaded latch bolt can include a shape or sloped upper surface contour that allows the beam to be raised from a lower slot to a higher slot by pulling or pushing upward on the beam, in which case the rail can push the latch bolt inward and against the spring to permit the beam to raise to a higher position (e.g., FIG. 6 showing the latch bolt 315 with a sloped upper surface that can contact the slot edge and be pushed inward when the beam is moved upwards). In this case, the beam can be raised from a lower position to a higher position without necessarily operating the single actuator mechanism. In some examples, operating the single actuator mechanism can still be used in order to move the beam from a higher position to a lower position.

In some examples, the actuator mechanism is operated by rotating a portion of the logistics beam 210 relative to a longitudinal orientation of the logistics beam 210 (e.g., rotating as indicated by the reference arrow 225). That is, the beam 210 can extend, in a longitudinal orientation (e.g., in the x-direction in FIG. 2), from one side of the rear enclosure (e.g., 110) to the opposing side of the rear enclosure. In examples, a portion of the beam 210 can be rotated relative to the longitudinal orientation (e.g., relative to an axis of rotation that is substantially parallel with the longitudinal orientation), and the rotation of the portion can, in turn, operatively cause a latch bolt 217 at each end of the beam to retract and disengage from a respective slot. In some examples, the portion that is rotated can include the cross member 212.

In examples, a logistics beam can include various mechanisms that are operable to retract the latch bolt (e.g., when the cross member is rotated). Referring to FIGS. 3-6, examples are depicted of a mechanism that can retract a latch bolt 315 (FIGS. 5 and 6) when a cross member 312 is rotated in either direction, as indicated by the reference arrow 324. Although FIGS. 3-6 only depict one end of a beam, the opposing end can include similar components.

The beam associated with FIGS. 3-6 can include similar features to those described above. For example, a latch assembly 314 can selectively engage a rail 318 with slots 320. In examples, the beam 310 can be moved up and down, relative to the rail 318, and a desired height for the beam 310 can be set by engaging the latch assemblies to a slot at that desired height.

In at least some examples, the beam 310 can include, at each end, a carriage 322 that is slidably coupled to rail 318 and that can slide along a channel or raceway 328 associated with the rail 318. That is, the carriage 322 can include sliding flanges 330 configured to fit in the channel 328, to impede the carriage 322 from disengaging from the channel 328, and to slide along the rail 318 when the height of the logistics beam 310 is being adjusted. In addition, the carriage 322 can include a roller bearing 332 that can facilitate movement of the logistics beam 310 relative to the rail 318. The carriage can be attached to the rail in various manners, and in some examples, the carriage is inserted into the rail at the top terminal end or bottom terminal end of the rail.

In at least some examples, the latch assembly 314 can include an elastic linear biasing mechanism (e.g., a helical spring) 326 that biases the latch bolt 315 outward, to a position configured to engage slots 320 in the rail 318. In addition, the latch assembly 314 can include a cam mechanism that operates to retract the latch bolt 315 (see also in FIGS. 5 and 6) against the force applied by the linear biasing mechanism. In some instances, the cam mechanism can include a relatively stationary cam with a relatively translating or rotating follower.

In examples, the carriage 322 can be associated with a first portion of a cam mechanism, which can include a cam block 334 with a camming surface 336. For example, as shown in FIG. 6, the carriage 322 can include brackets that fasten to a side of the cam block 334 (e.g., as depicted by the alignment reference lines). In addition, the latch assembly 314 can be associated with a second portion of the cam mechanism, which can include a rotating follower 338 that rotates when the cross member 312 is rotated. In examples, the cross member 312, the latch bolt 315, the rotating follower 338 can be separate structures that are connected to one another and that can collectively rotate with one another relative to the carriage 322 and the cam block 334. For example, a shaft 313 (e.g., FIG. 3B), which can be made up of one or more components, can extend from cross member 312 and through the cam block 334 and to the latch bolt 315, such that the rotation of the cross member 315 is transferred (via the shaft 313) to the latch bolt 315. In addition, the shaft and/or the latch bolt 315 can be operatively connected, by way of a follower bracket 339 to the follower 338, such that when the shaft 313 rotates (in response to the cross member 325 rotating), the follower bracket 339 and the follower 338 also rotate.

Figure 3:
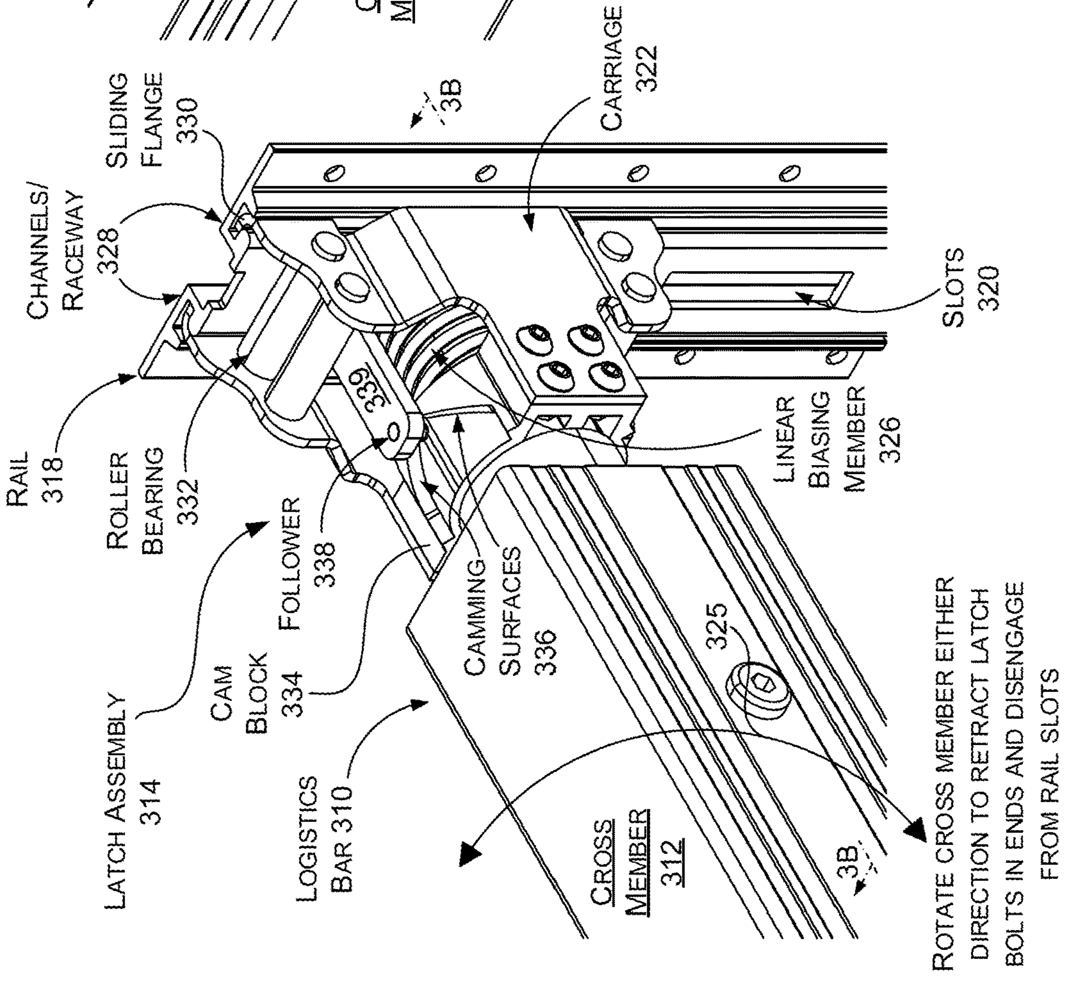
FIG. 3 depicts an end of a logistics beam with a retractable latch assembly, in accordance with examples of this disclosure.
Figure 3B:
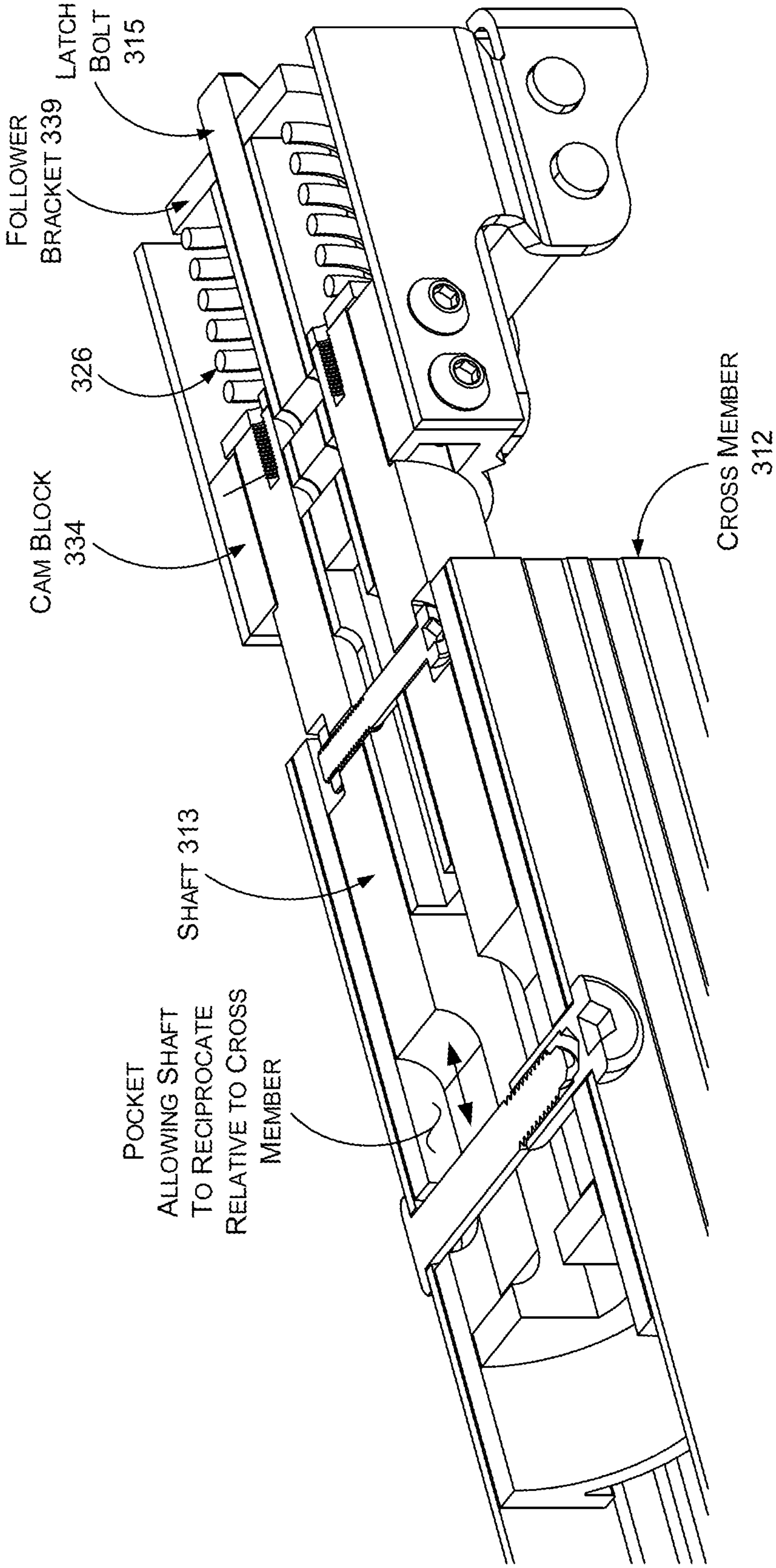
FIG. 3B depicts a cross section based on the 3B-3B reference line in FIG. 3, in accordance with examples of this disclosure.

In this example, the cam block 334 with the camming surface 336 can comprise a relatively stationary cam, and the follower 338 can comprise a relatively translating or rotating component. As such, when the cross member 312 is rotated, the follower 338 is also rotated and, based on the engagement with the camming surface 336 translated towards the cross member 312 and against the force of the linear biasing mechanism 326. For example, as shown in FIG. 3B, the shaft 313 or the cross member 312 can include an opening, recess, or pocket 311 that can permit the shaft 313 to reciprocate into the cross member 312, and operatively pull the latch bolt 315 to a retracted state. When the rotational force on the cross member is removed (e.g., released by the operator), then the force applied by the linear biasing mechanism 326 can return the follower 338 and the follower bracket 339 to it resting position, while at the same time pushing the latch bolt 315 back to a non-retracted position for engaging the slotted rail.

In some examples, the cam block 334 can include camming surfaces on the top (but not the bottom), on the bottom (but not the top), or on both the top and bottom. As illustrated, the cam block 334 includes camming surfaces 336 that are on the top and bottom. In addition, the cam block 334 can include camming surfaces on one or both sides. As illustrated, the cam block 334 includes camming surfaces 336 in either direction, such that rotation in either direction will operate to retract the latch bolt. That is, on both the top and bottom, the cam block 334 can include camming surfaces 336 in either direction, such that the cross member 312 can rotate in either direction in order to retract the latch bolt 315. In some examples, the cam block 334 can include one or more camming surfaces that facilitate unidirectional operation, such that retraction is facilitated by rotating in one direction, but not necessarily the opposite direction. Furthermore, the follower bracket 339 can extend along the top and/or bottom and/or along the sides, in positions that correspond with the camming surfaces.

Referring now to FIGS. 7, 8, and 9 an example of an alternative assembly is illustrated according to examples of the present disclosure. The beam associated with FIGS. 7, 8, and 9 can include at least some similar features to those described above, and for brevity, some of those same or similar features may not be described in association with FIGS. 7, 8, and 9, but it is understood that the assembly associated with FIGS. 7, 8, and 9 can still include those same or similar structures. In examples, assembly in FIGS. 7, 8, and 9 can selectively engage a rail 418 with slots 420 (FIG. 9). In examples, the beam 410 can be moved up and down, relative to the rail 418, and a desired height for the beam 410 can be set by engaging the latch assemblies to a slot at that desired height.

In at least some examples, the beam 410 can include, at each end, a carriage 422 that is slidably coupled to rail 418 and that can slide along a channel or raceway associated with the rail. That is, the carriage 422 can include sliding flanges 430 configured to fit in the channel of the rail, to impede the carriage 422 from disengaging from the channel, and to slide along the rail 418 when the height of the logistics beam 410 is being adjusted. In addition, the carriage 422 can include a roller bearing 432 that can facilitate movement of the logistics beam 410 relative to the rail 418.

In at least some examples, the latch assembly can include an elastic linear biasing mechanism (e.g., a helical spring) 426 that biases the latch bolt 422 outward, to a position configured to engage slots 420 in the rail 418. In addition, the latch assembly can include a cam mechanism that operates to retract the latch bolt 415 (easier to see in FIG. 8) against the force applied by the linear biasing mechanism 426. In some instances, the cam mechanism can include a relatively stationary cam with a relatively translating or rotating follower.

In examples, the carriage 422 can be associated with a first portion of a cam mechanism, and the first portion can include one or more camming structures 434 and 436. For example, as shown in FIGS. 7 and 8, the carriage 422 can include brackets that fasten to a cylindrical housing 423, and the brackets can be connected (directly or indirectly) to the camming structures 434 and 436. In addition, the latch assembly can be associated with a second portion of the cam mechanism, which can include a rotating follower 438 (with follower surfaces 439 that rotate when the cross member 412 is rotated). In examples, the cross member 412, the latch bolt 415, the rotating follower 438 can be separate structures that are connected to one another and that can collectively rotate with one another relative to the carriage 422 (e.g., relative to the cylindrical housing 423) and the camming structures 434. For example, a shaft (which can be made up of one or more components) can extend from cross member 412 and through the cylindrical hosing 423 and to the latch bolt 415 and the follower 438, such that the rotation of the cross member 415 (as indicated by arrow 425) is transferred (via the shaft) to the latch bolt 415 and the follower 438. In addition, the shaft and/or the latch bolt 415 can be operatively connected, to the follower 438, such that when the shaft rotates (in response to the cross member 412 rotating), the follower bracket 438 also rotates, such the follower surfaces 439 can traverse across the camming structures 434 to cause the bolt 415 to retract. As depicted in FIG. 9, the cross member 412 has been rotated and the follower 438 has been pulled towards the cross member 412, based on the interaction between the follower surface 439 and the camming structure 434

In this example, the camming structures 434 can comprise a relatively stationary cam, and the follower 438 can comprise a relatively translating or rotating component. As such, when the cross member 412 is rotated, the follower 438 is also rotated and, based on the engagement with the camming structures 434, is translated towards the cross member 412 and against the force of the linear biasing mechanism 426.

The follower 438 includes the follower surfaces 439 that extend annularly in one direction, but not both directions. In other words, the cross member 412 is operable to retract the latch bolt 415 when rotated clockwise (based on the view in FIG. 8), but would not function to retract the latch bolt 415 if rotated in the opposite direction, such that this is an example of a unidirectional latch-bolt retractor. In other examples, the follower 438 can be configured with follower surfaces that extend annularly in both directions to permit bi-directional retraction when the cross member is rotated in either direction.

In examples, a carriage can include various structures for engaging with a rail and transiting along the rail. In addition, the rail can have various types and shapes of channels (e.g., formed by extrusion, folding, etc.) to mate with components of the carriage. For example, referring to FIGS. 10A and 10B, another example is provided. In FIGS. 10A and 10B, a carriage 522 includes at least some components that are similar to the carriage 322, and for brevity those components are not described again (but it is understood that the description can be equally applied where appropriate).

In examples, the carriage 522 includes a plurality of roller bearings (collectively 532). For instance, the roller bearings include one or more first roller bearings 532*a* on one side of a channel flange 529, and one or more second roller bearings 532*b* on the opposite side of the channel flange 529. In addition, the carriage 522 includes the first roller bearings 532*a* and the second roller bearings 532*b* on both sides of the channel, as well as on the top and bottom of the carriage 522. In some instances, as shown in FIGS. 10A and 10B, the roller bearings 532*a* and 532*b* can include two or more roller bearings at each position. In some examples, a single roller bearing can be on each side of the channel flange 529. The number and size of roller bearings can be optimized based on various factors, such as the overall weight of the logistics beam.

This detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

The invention claimed is:

1. A logistics beam for engaging a slotted rail in a cargo trailer, the logistics beam comprising:

a tubular cross member having a longitudinal axis, a first terminal end, and a second terminal end;

a shaft that is secured to the first terminal end, such that, when the tubular cross member rotates relative to the longitudinal axis, the shaft also rotates, the shaft being configured to reciprocate relative to the tubular cross member;

a latch bolt coupled to the shaft, the latch bolt configured to reciprocate with the shaft and to, based on reciprocation, selectively engage the slotted rail, wherein the latch bolt is operatively coupled to a first part of a cam assembly; and a carriage coupled to the shaft near the first terminal end and configured to slide relative to the slotted rail, wherein:

the shaft and the latch bolt are configured to rotate together and relative to the carriage, and the carriage comprises a second part of the cam assembly configured to, when the shaft and the latch bolt are rotated, engage the first part of the cam assembly and cause the shaft and the latch bolt to reciprocate into the tubular cross member.

2. The logistics beam of claim 1, wherein the carriage comprises one or more roller bearings.

3. The logistics beam of claim 2, wherein the carriage comprises first roller bearings that are spaced apart from second roller bearings, and wherein the first roller bearings and the second roller bearings are configured to be positioned on opposite sides of a flange of the slotted rail.

4. The logistics beam of claim 1, wherein the carriage comprises one or more sliding flanges configured to slidably engage the slotted rail.

5. The logistics beam of claim 1, wherein the shaft comprises a slotted pocket, and wherein a fastener extends through the tubular cross member and is positioned in the slotted pocket.

6. The logistics beam of claim 1 further comprising, a spring configured to bias the latch bolt away from the shaft.

7. The logistics beam of claim 1, wherein the latch bolt comprises an angled top face.

8. The logistics beam of claim 1, wherein the cross member is bi-directionally rotatable relative to the longitudinal axis and is operational to retract the latch bolt when rotated in either direction.

9. The logistics beam of claim 1 further comprising:

a second shaft that is secured to the second terminal end, such that, when the tubular cross member rotates relative to the longitudinal axis, the second shaft also rotates, the second shaft being configured to reciprocate relative to the tubular cross member;

a second latch bolt coupled to the second shaft, the second latch bolt configured to reciprocate with the second shaft, wherein the second latch bolt is operatively coupled to a first part of a second cam assembly; and a second carriage coupled to the second shaft near the second terminal end, wherein:

the second shaft and the second latch bolt are configured to rotate together and relative to the second carriage, and the second carriage comprises a second part of a second cam assembly configured to, when the second shaft and the second latch bolt are rotated, engage the first part of the second cam assembly and cause the second shaft and the second latch bolt to reciprocate into the tubular cross member.

10. A logistics beam for engaging a slotted rail in a cargo trailer, the logistics beam comprising:

a cross member having a longitudinal axis, a first terminal end, and a second terminal end;

a first latch assembly coupled to the first terminal end and comprising a first latch bolt and a first cam assembly; and a second latch assembly coupled to the second terminal end and comprising a second latch bolt and a second cam assembly, wherein the first cam assembly and the second cam assembly translate rotation of the cross member relative to the longitudinal axis into simultaneous linear movement of the first latch bolt and the second latch bolt.

11. The logistics beam of claim 10, wherein the first latch assembly is coupled to the cross member via a shaft, and wherein the first latch assembly and the shaft rotate together with the cross member in association with the rotation.

12. The logistics beam of claim 10, wherein the first latch assembly comprises a first carriage configured to engage the slotted rail and facilitate transit along the slotted rail.

13. The logistics beam of claim 12, wherein the first carriage comprises one or more roller bearings to facilitate transit of the first carriage relative to the slotted rail.

14. The logistics beam of claim 13, wherein the first carriage comprises first roller bearings that are spaced apart from second roller bearings, and wherein the first roller bearings and the second roller bearings are configured to be positioned on opposite sides of a flange of the slotted rail.

15. The logistics beam of claim 10, wherein the rotation of the cross member is in a first direction or in a second direction, which is opposite to the first direction, and wherein the first cam assembly and the second cam assembly translate the rotation in the first direction and in the second direction.

16. The logistics beam of claim 10, wherein the first latch bolt comprises an angled top surface that is configured to, upon receiving a force that is perpendicular to the longitudinal axis, transfer the force into a second linear movement of the first latch bolt.

17. The logistics beam of claim 10 further comprising, a first linear biasing mechanism configured to bias the first latch bolt in a direction opposite the linear movement and a second linear biasing mechanism configured to bias the second latch bolt in a direction opposite the linear movement.

18. A method of adjusting a position of a logistics beam relative to a pair of slotted rails, the method comprising:

rotating a cross member of the logistics beam in a first direction relative to a longitudinal axis of the cross member;

retracting, based on the rotating in the first direction, a latch bolt operatively attached to the cross member;

changing a position of the cross member relative to the pair of slotted rails;

rotating the cross member of the logistics beam in a second direction that is opposite the first direction; and extending, based on the rotating in the second direction, the latch bolt to engage the pair of slotted rails.

19. The method of claim 18, wherein changing the position comprises moving the logistics beam from a higher position to a lower position.

20. The method of claim 19 further comprising, moving the logistics beam from the lower position to the higher position by applying an upward force on the logistics beam; and causing an angled surface of the latch bolt to contact a slotted rail and retract the latch bolt.

* * * * *